Figure 1:
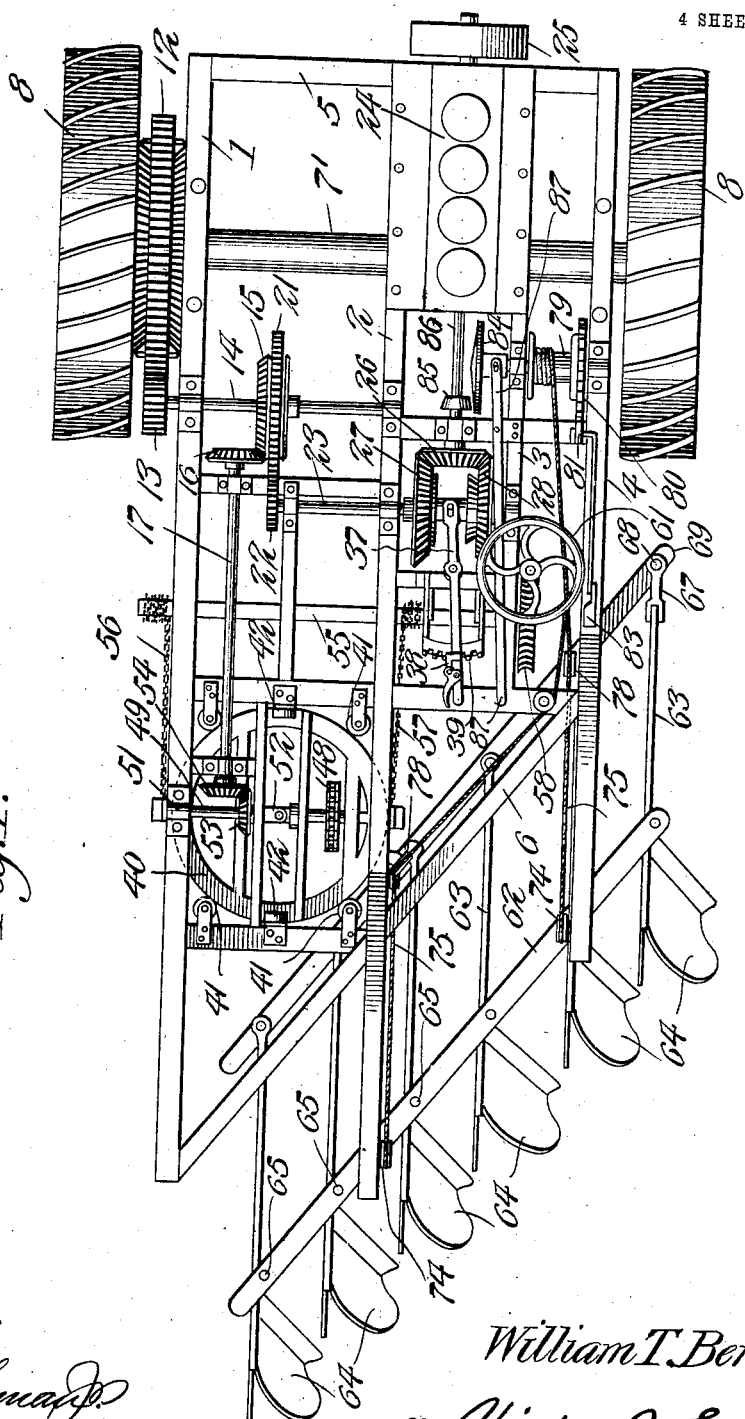

W. T. BENNETT.
MOTOR PLOW.
APPLICATION FILED JUNE 17, 1908.

941,299.

Patented Nov. 23, 1909.
4 SHEETS—SHEET 1.

Witnesses
Geo. Ackman Jr.
R. M. Smith.

Inventor
William T. Bennett,
By Victor J. Evans
Attorney.

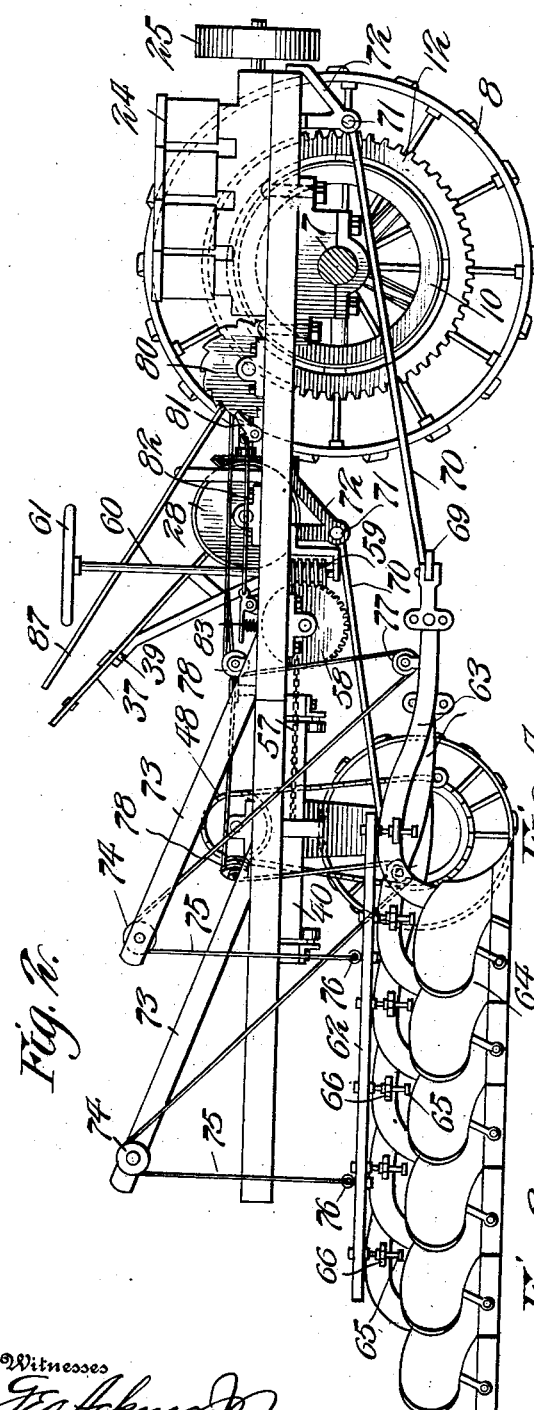
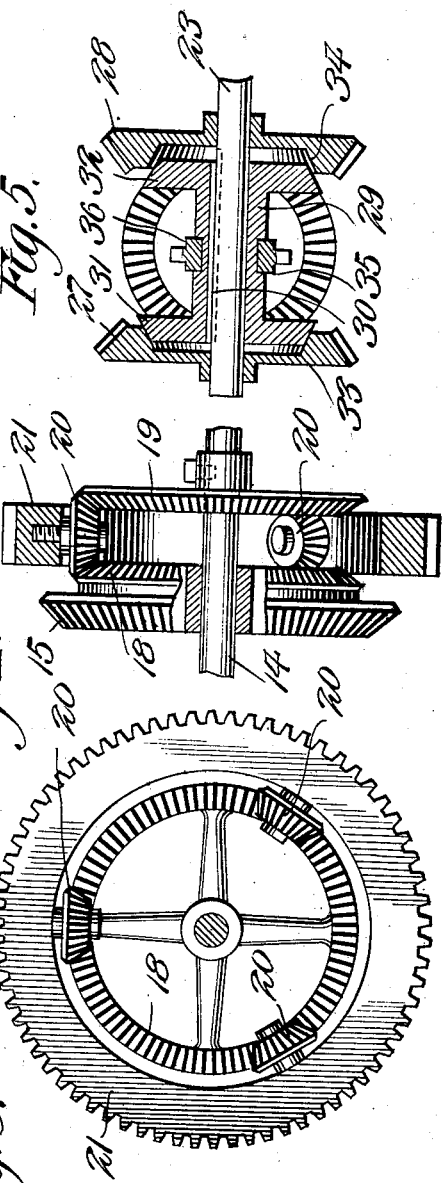
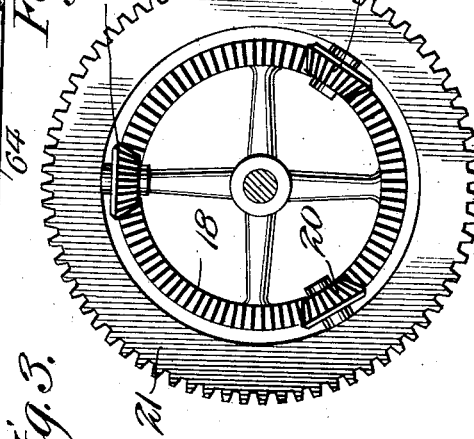

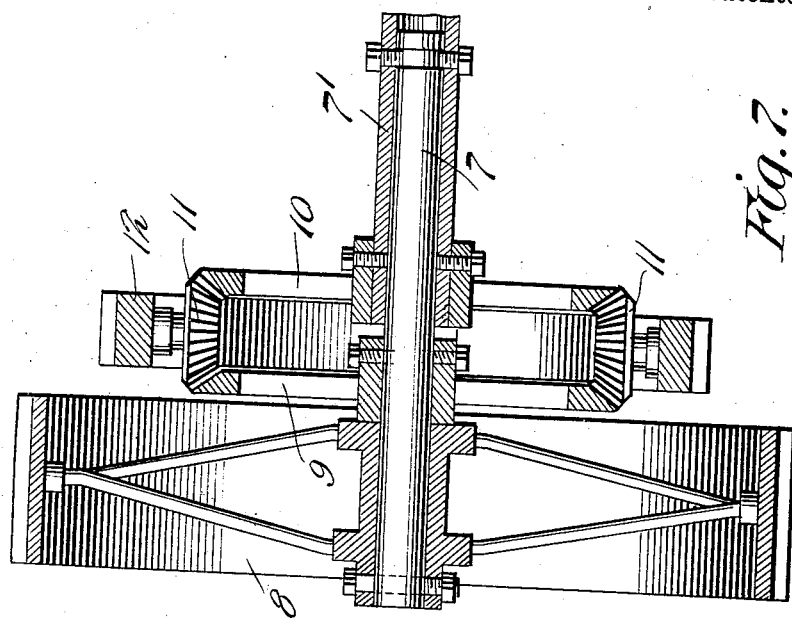
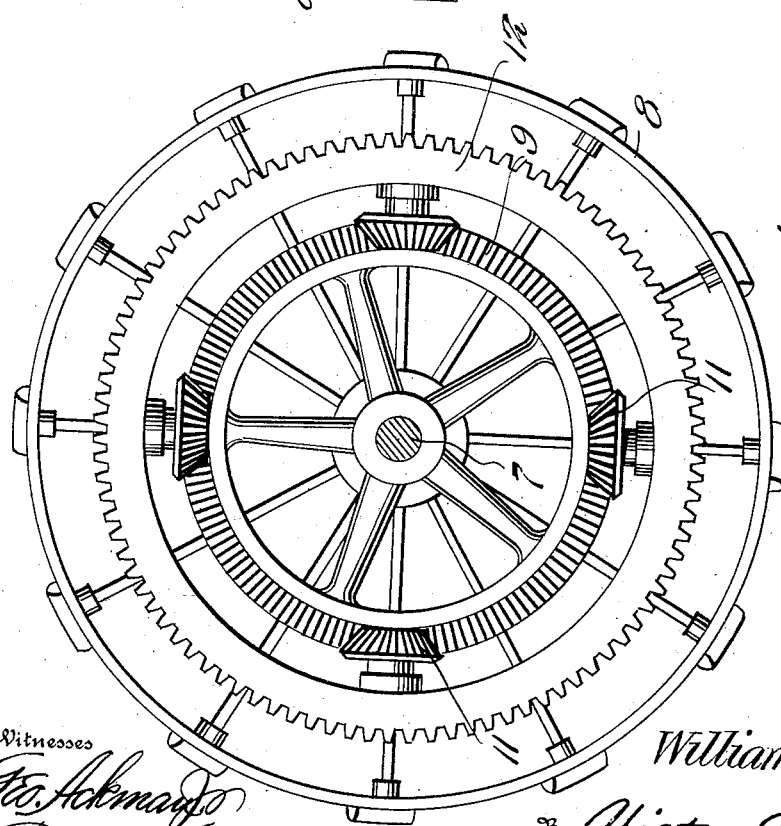

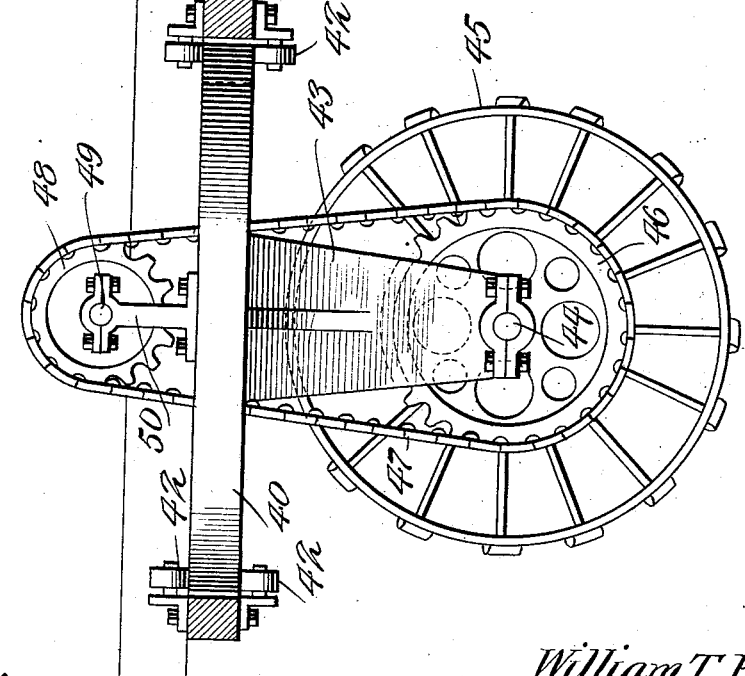

UNITED STATES PATENT OFFICE.

WILLIAM T. BENNETT, OF GOLDFIELD, NEVADA.

MOTOR-PLOW.

941,299.  Specification of Letters Patent. Patented Nov. 23, 1909.

Application filed June 17, 1908. Serial No. 438,978.

*To all whom it may concern:*

Be it known that I, WILLIAM T. BENNETT, a citizen of the United States of America, residing at Goldfield, in the county of Esmeralda and State of Nevada, have invented new and useful Improvements in Motor-Plows, of which the following is a specification.

This invention relates to motor plows, the object of the invention being to produce a self-propelling traction gang plow of light weight in which all of the supporting ground wheels are traction wheels arranged in such a way as to provide a comparatively short-wheel base and a correspondingly short frame which is admirably adapted for turning short corners, and being handled in circumscribed places.

Another object of the invention is to so arrange and mount the steering wheel that it may be utilized in rear of the main traction wheels and thereby overcome the tendency of the steering wheel to lift from the ground and become inoperative for steering purposes in heavy pulling.

With the above and other objects in view, the nature of which will more fully appear as the description proceeds, the invention consists in the novel construction, combination and arrangement of parts as herein fully described, illustrated and claimed.

In the accompanying drawings,—Figure 1 is a plan view of a motor driven gang plow embodying the present invention. Fig. 2 is a side elevation thereof with the main axle in section and the adjacent traction wheel removed. Fig. 3 is a sectional view of the differential gearing which is interposed between the motor and driving pinion. Fig. 4 is a diametrical section through the same. Fig. 5 is a sectional view of the transmission gear including the clutch. Fig. 6 is a section on an enlarged scale, showing the differential gearing interposed between the driving pinion and the main axle. Fig. 7 is a diametrical section through the same, showing the inner section of the axle in elevation. Fig. 8 is a section taken vertically and diametrically of the steering frame, showing the steering wheel in elevation. Fig. 9 is a similar section taken at right angles to Fig. 8 and showing the steering wheel in rear elevation.

The main frame of the machine comprises the longitudinal bars 1, 2, 3 and 4 connected at the forward end by a front cross bar 5 extending substantially at right angles to the longitudinal bars and connected at the rear end by an oblique cross bar 6, while said longitudinal bars are connected at a plurality of other intermediate points by means of additional cross bars which serve as the support for the bearings of the various mechanical elements hereinafter particularly described.

Adjacent to the forward portion of the frame and beneath the same is arranged the main axle 7, a portion of which is tubular, as shown at 7' in Fig. 7 in order to provide for the relative turning movement of the main carrying traction wheels 8 which are mounted on the two sections of said axle at opposite sides of the main frame, as shown in Fig. 1. The differential gearing, by means of which the two portions of the axle referred to are connected, is best illustrated in Figs. 6 and 7, wherein it will be observed that just inside of one of the traction wheels 8 the solid section 7 of the axle has mounted fast thereon a beveled gear wheel 9, while just opposite said wheel 9 is another corresponding beveled gear wheel 10, the hub of which is fast on the tubular section 7' of the main axle. Interposed between the wheels 9 and 10 is a series of planetary pinions 11 which are mounted on stud axles projecting radially inward from a spur gear rim 12 which meshes with and is actuated by a drive pinion 13, as shown in Fig. 1, the pinion 13 being fast on a counter shaft 14.

The counter shaft 14 is provided with a beveled gear wheel 15 meshing with a beveled pinion 16 on a longitudinal drive shaft 17 which imparts motion to the rear steering traction wheel, as will hereinafter appear. Adjacent to the gear wheel 15, the shaft 14 is equipped with differential gearing, best illustrated in Figs. 3 and 4, and shown as comprising a beveled gear wheel 18 loose on the counter shaft 14 and a similar beveled gear wheel 19 fast on said shaft, while interposed between the wheels 18 and 19 is a plurality of planetary pinions 20 mounted on the inner side of a spur gear rim 21 which meshes with and is driven by a spur pinion 22 on a transmission shaft 23.

Mounted on the forward portion of the frame and extending partially over the main shaft 7 is a motor 24, shown as of the ordinary four-cylinder internal combustion type, the shaft of which is shown as provided at one end with a fly wheel 25, while the other shaft is provided with a beveled gear wheel 26 which meshes with oppositely arranged twin beveled gear wheels 27 and 28. The wheels 27 and 28 are both loose on the shaft 23, but either one of said wheels is adapted to be locked to the shaft 23 by means of a clutch, as shown in Fig. 5, embodying a sleeve 29 keyed to the shaft, as shown at 30, and provided at opposite ends with clutch heads 31 and 32 movable into and out of corresponding recesses 33 and 34 in the wheels 27 and 28, respectively. Centrally the sleeve is provided with a groove 35 in which works the fork 36 of a clutch lever 37 fulcrumed on the machine frame and provided with a thumb latch 38 adapted to interlock with a rack segment 39, whereby either clutch head may be moved into engagement with the respective gear 27 or 28 and locked, the gearing thus described being adapted for the purpose of driving the machine forward or backward, as may be desired.

Adjacent to the rear portion of the main frame of the machine there is provided an annular oscillatory frame 40 which moves between guide rollers 41 journaled on vertical axes in brackets projecting from adjacent frame bars, the said annular frame also working between other supporting rollers 42 arranged above and beneath the annular frame and journaled on horizontal axes in other brackets connected with the machine frame. Extending downward from the frame 40 is a fork 43 carrying an axle 44 on which is mounted a traction steering wheel 45, the same being driven by means of a sprocket wheel 46 having a fixed relation to the traction wheel 45, around which passes a sprocket chain 47 which extends upward through the annular frame 40 and passes around a driving sprocket wheel 48 fast on a tumbling shaft 49, one portion of which is journaled in brackets 50 carried by the annular frame 40, while the other portion thereof is journaled in brackets 51 mounted on the main frame of the machine. The tumbling shaft 49 is provided with a tumbling joint 52 about midway of its length, and on the section opposite that on which the sprocket wheel 48 is mounted there is mounted a miter gear 53 which meshes with a corresponding miter gear 54 on the shaft 17 above referred to, motion being transmitted by the means described to the steering traction wheel 45. The wheel 45 thus acts as the steering wheel of the machine and also as a traction wheel to assist in propelling the machine, a feature which is especially valuable in propelling the machine around short turns or curves.

The steering mechanism embodies a shaft 55 which extends transversely of the machine frame, as shown in Fig. 1, and is provided with steering chains 56 and 57 which are wrapped in opposite directions around the shaft 55, as indicated in Fig. 1, the ends of said chains being connected to the annular frame 40 at diametrically opposite points. On one end of the shaft 55 is mounted fast a worm wheel 58 which meshes with and is actuated by a worm 59 on a steering post 60 provided with a hand wheel 61 within reach of the motorman, who by turning said wheel 61 may impart a corresponding movement to the shaft 55 to wind or unwind the chains 56 and 57 and turn the frame 40, correspondingly turning the steering wheel 45. The tumbling joint 52 allows for such turning of the steering wheel without affecting the driving mechanism by which rotary motion is imparted to the wheel 45 for propelling the machine.

In rear of the oblique cross bars 6 and parallel therewith is arranged a plow-lifting bar 62 which is connected to all of the beams 63 of the plow 64 by means of bolts 65 which are connected at their upper ends to the lifting bar 62, while the lower portions of said bolts pass through guides 66 on the plow beams 63, as shown in Fig. 2, thus allowing for a limited up and down movement of the plows independently of each other without affecting the lifting bar 62. The forward ends of the plow beams 63 are connected to clevises 67 which are in turn connected at 68 to a draw bar 69 arranged parallel to the lifting bar 62 and connected by draft rods 70 to the main frame of the machine, said draft rods being shown as pivotally connected at 71 to brackets 72 secured to the underside of the main frame, see Fig. 2.

Inclining upwardly and rearwardly from the main frame and fastened to said frame are supporting bars 73 carrying at their rear ends rollers 74 around which pass lifting connections 75 having their ends connected by means of eye-bolts 76, or their equivalent, to the lifting bar 62. After passing over the pulleys or rollers 74, the connections 75 pass under other pulleys 77 on the upper side of the draw bar 69 and thence upward over direction pulleys 78 on the machine frame, the connections 75 being then wound upon a drum 79 journaled on the machine frame and having fast thereto a ratchet wheel 80 with which engages a pawl or detent 81 connected by means of a rod 82 with a foot lever 83, by means of which the pawl 81 may be thrown out of engagement with the ratchet wheel 80 to release the tension on the connections 75 for the purpose of lowering the plows 64.

In order to provide for lifting the plows, the shaft of the drum 79 is provided with a friction wheel 84 movable into and out of engagement with a friction pinion 85 fast on the engine shaft 86. The hub of the wheel 84 has a sliding keyed connection with the shaft of the drum 79 and is engaged by the fork of a shifting lever 87 arranged within convenient reach of the motorman, who may thus readily shift the wheel 84 into engagement with the wheel 85 and thereby utilize the power of the engine for turning the drum 79 and winding up the connections 75 to raise the plows 64 to any desired degree. In moving the machine from place to place, the connections 75 will be wound up sufficiently to elevate the plows to a point where they will clear the ground. It will be noted that the first effect of winding up the connections 75 is to raise the points of the plows by first elevating the draw bar 69. This causes the plows to automatically ride out of the ground, point first. The first effect of releasing the connections 75 is to lower the draw bar 69, thereby causing the points of the plows to dip downward and enter the soil.

It will be understood that the invention hereinabove described is adapted for use in connection with a steam engine in lieu of the motor illustrated in the drawings, the only change necessary being to mount an upright reversely on the steam engine in place of the gears 26, 27 and 28 and place the pinion 22 on the shaft of the steam engine. The engine boiler may be placed at the front of the machine and may be either an upright, tubular or water tube boiler while the lifter action may be worked by arranging the friction wheel 84 so that it may be moved into and out of contact with a similar wheel on the engine shaft.

Having thus described the invention, what is claimed as new, is:—

1. In a machine of the class specified, a main frame, a sectional main shaft, traction wheels mounted on the sections of said shaft, differential gearing connecting the shaft sections, a motor geared to the differential gearing, an annular oscillatory steering frame, a combined steering and traction wheel the shaft of which is carried by said annular frame, a tumbling shaft geared to the motor, a gear wheel on one section of the tumbling shaft, and driving means interposed between the motor and the tumbling shaft and between the tumbling shaft and said steering wheel for imparting rotary motion to the steering wheel while permitting the steering frame and steering wheel to be turned.

2. In a machine of the class specified, a main frame comprising a rear cross bar set obliquely to the line of draft, a sectional main shaft, forwardly arranged traction wheels mounted on the sections of said shaft, differential gearing connecting the shaft sections, a motor geared to the differential gearing, an annular oscillatory steering frame located back of the forward traction wheels and to one side of the center line of draft and in front of the rear oblique cross bar, a combined steering and traction wheel the shaft of which is carried by said annular frame, a tumbling shaft geared to the motor, a gear wheel on one section of the tumbling shaft, and driving means interposed between the motor and the tumbling shaft and between the tumbling shaft and said steering wheel for imparting rotary motion to the steering wheel while permitting the steering frame and steering wheel to be turned.

3. In a machine of the class specified, a machine frame embodying an oblique rear end bar, traction wheels at the front of the frame, a single combined steering and traction wheel located in rear of the aforesaid traction wheels and at the rear angle of the frame, a motor mounted on the machine frame, and differential gearing common to both the front traction wheels and rear steering and traction wheel, whereby each of said wheels is driven at a speed proportionate to the extent of its travel.

In testimony whereof I affix my signature in presence of two witnesses.

WILLIAM T. BENNETT.

Witnesses:
L. N. GRIDLEY,
A. C. TAYLOR.